United States Patent
Stephenson et al.

(10) Patent No.: US 11,097,359 B2
(45) Date of Patent: Aug. 24, 2021

(54) MINIMUM QUANTITY LUBRICATION MULTIDIAMETER CUTTING TOOL OIL DELIVERY

(71) Applicant: Ford Global Technologies, LLC, Dearborn, MI (US)

(72) Inventors: David Alan Stephenson, Detroit, MI (US); Ethan Timothy Hughey, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 4 days.

(21) Appl. No.: 16/513,968

(22) Filed: Jul. 17, 2019

(65) Prior Publication Data
US 2021/0016370 A1   Jan. 21, 2021

(51) Int. Cl.
  *B23B 51/06*   (2006.01)
  *B23Q 11/10*   (2006.01)
  *B23B 51/00*   (2006.01)

(52) U.S. Cl.
  CPC .......... *B23B 51/06* (2013.01); *B23Q 11/1023* (2013.01); *B23B 51/009* (2013.01); *B23B 2250/12* (2013.01)

(58) Field of Classification Search
  CPC ... B23B 51/06; B23B 2250/12; B23B 51/009; B23C 5/28; B23Q 11/1023
  USPC ..................................................... 408/57, 59
  See application file for complete search history.

(56) References Cited

U.S. PATENT DOCUMENTS

2006/0029482 A1\*  2/2006  Stoll ..................... B23B 51/06
                                                          409/136

FOREIGN PATENT DOCUMENTS

| CN | 108655467 | | 10/2018 | |
|---|---|---|---|---|
| CN | 107042165 | | 11/2018 | |
| DE | 102004055377 | | 10/2006 | |
| DE | 102013105015 | A1 \* | 11/2014 | ........... B23C 5/2221 |
| DE | 102014010922 | A1 \* | 1/2016 | ........... E04B 1/6806 |
| DE | 202018104291 | U1 \* | 7/2018 | ............. B23B 51/08 |
| WO | 2005105351 | | 11/2005 | |
| WO | 2014111110 | | 7/2014 | |

\* cited by examiner

*Primary Examiner* — Eric A. Gates
*Assistant Examiner* — Paul M Janeski
(74) *Attorney, Agent, or Firm* — Burris Law, PLLC

(57) ABSTRACT

A cutting tool includes a body having a base and a cutting portion. The cutting portion defines a plurality of first edges and a plurality of second edges. The body defines a trunk passage, a plurality of first branch passages, and a plurality of first independent passages. Each of the first branch passages is open to the trunk passage and has an outlet open to an exterior of the cutting portion proximate to a corresponding one of the second edges. Each of the first independent passages is independent of the trunk passage and the first branch passages and has an outlet open to an exterior of the cutting portion proximate to a corresponding one of the first edges.

20 Claims, 5 Drawing Sheets

MINIMUM QUANTITY LUBRICATION MULTIDIAMETER CUTTING TOOL OIL DELIVERY

FIELD

The present disclosure relates to a cutting tool and more specifically to oil delivery in a minimum quantity lubrication cutting tool.

BACKGROUND

The statements in this section merely provide background information related to the present disclosure and may not constitute prior art.

Conventional machining uses high volume flow of a liquid lubricant over the cutting edges of the tool. Some tools having multiple cutting diameters have internal passages that provide this liquid lubricant to each cutting edge. Since the conventional liquid lubricant is essentially an incompressible fluid, flow from each passage to each cutting edge remains substantially based on the pressure of the liquid supplied to the tool.

In contrast, minimum quantity lubrication ("MQL") machining uses lubrication supplied to the cutting edges of a tool through a lean air-oil mist, rather than through the high-volume liquid-based emulsion in conventional machining. Tools designed for liquid lubricant flow through internal passages suffer from unbalanced lubricant flow when used with the air-oil mist of MQL machining. The ratio of air to oil in the air-oil mist is typically very high and the lubricant mist acts as a compressible fluid (unlike the incompressible liquid lubricant of conventional machining). As a result, a disproportionate volume of the compressible lubricant mist tends to exit the tool via the passages at the larger diameter cutting edges, despite the majority of the cutting taking place at the smaller diameter cutting edges. This can result in wasted lubricant and excess wear on the tool.

The present disclosure addresses these and other issues associated with MQL cutting tools.

SUMMARY

This section provides a general summary of the disclosure and is not a comprehensive disclosure of its full scope or all of its features.

In one form, a cutting tool includes a body having a base and a cutting portion. The cutting portion defines a plurality of first edges and a plurality of second edges. The body defines a trunk passage, a plurality of first branch passages, and a plurality of first independent passages. Each of the first branch passages is open to the trunk passage and has an outlet open to an exterior of the cutting portion proximate to a corresponding one of the second edges. Each of the first independent passages is independent of the trunk passage and the first branch passages. Each of the first independent passages has an outlet open to an exterior of the cutting portion proximate to a corresponding one of the first edges. According to a variety of alternate forms: the trunk passage is coaxially disposed about a central axis of the body and the first independent passages are not coaxial with the central axis; the body is disposed about a central axis and the first edges are located at a first diameter and the second edges are located at a second diameter that is greater than the first diameter; the body defines a plurality of second branch passages and the cutting portion defines a plurality of third edges, the third edges are located at a third diameter that is greater than the second diameter, wherein each of the second branch passages is open to the trunk passage and has an outlet open through an exterior of the cutting portion proximate to a corresponding one of the third edges; the body defines a plurality of second independent passages and the cutting portion defines a plurality of third edges, the third edges being located at a third diameter that is greater than the first diameter and less than the second diameter, wherein each of the second independent passages is independent of the trunk passage, the first branch passages, and the first independent passages; the first edges are rotationally offset from the second edges; the branch passages extend linearly from the trunk passage to the second edges and the first independent passages extend linearly through the cutting portion to the first edges; the base defines a pre-chamber open through an end of the base that is opposite the cutting portion, the trunk passage having an inlet open to the pre-chamber, each of the first independent passages having an inlet open to the pre-chamber; the first and second edges are helical; the first and second edges are planar; a minimum quantity lubrication (MQL) cutting machine can include the cutting tool according to any of the preceding forms, wherein the MQL cutting machine is configured to provide a mixture of oil and air to the cutting tool.

In another form, a cutting tool includes a body having a base and a cutting portion. The body defines a trunk passage, a plurality of first branch passages, and a plurality of first independent passages. The cutting portion defines a plurality of first edges at a first diameter and a plurality of second edges at a second diameter that is greater than the first diameter. The base defines an inlet of the trunk passage. Each of the first branch passages has an inlet open to the trunk passage and an outlet open to an exterior of the cutting portion proximate to a corresponding one of the second edges. Each of the first independent passages has an inlet defined by the base and an outlet open to an exterior of the cutting portion proximate to a corresponding one of the first edges. According to a variety of alternate forms: the first independent passages are independent of the first branch passages and the trunk passage throughout the body; the body is disposed about a rotational axis and the trunk passage extends longitudinally coaxial with the rotational axis; the first edges are rotationally offset from the second edges; the first independent passages extend along corresponding first axes that are parallel and offset from the rotational axis; the first branch passages extend linearly from the trunk passage to the second edges; the body defines a plurality of second branch passages and the cutting portion defines a plurality of third edges, the third edges being at third diameter greater than second diameter, wherein each of the second branch passages has an inlet open to the trunk passage and an outlet open to an exterior of the cutting portion proximate to a corresponding one of the third edges; the body defines a plurality of second independent passages and the cutting portion defines a plurality of third edges, the third edges being at third diameter different than first diameter and the second diameter, wherein each of the second independent passages is independent of the trunk passage, the first branch passages, and the first independent passages, wherein each second independent passage has an outlet open to an exterior of the cutting portion proximate to a corresponding one of the third edges; a minimum quantity lubrication (MQL) cutting machine can include the cutting tool according to any of the preceding forms, wherein the MQL cutting machine is configured to provide a mixture of oil and air to the cutting tool.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
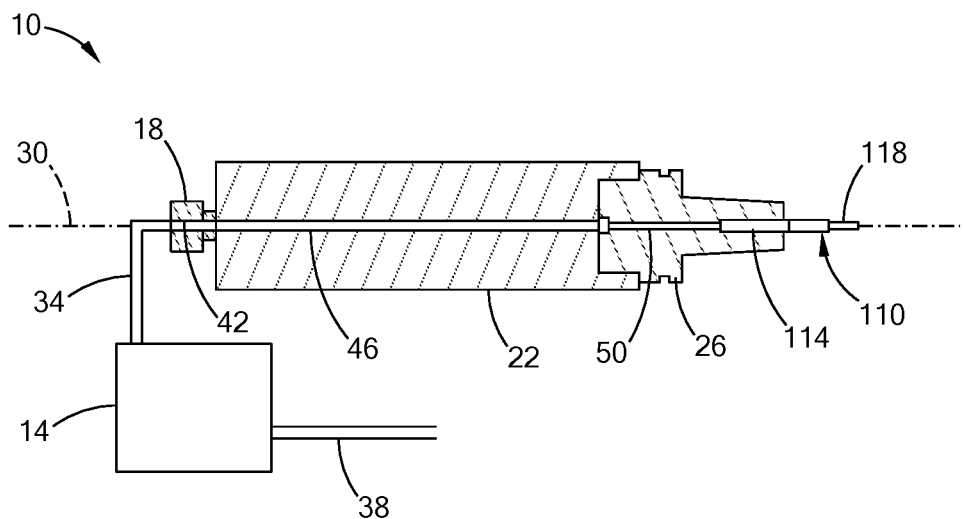
FIG. 1 is a schematic partial cross-sectional view of a portion of a cutting machine including a minimum quantity lubrication system and a cutting tool in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features. Examples are provided to fully convey the scope of the disclosure to those who are skilled in the art. Numerous specific details are set forth such as types of specific components, devices, and methods, to provide a thorough understanding of variations of the present disclosure. It will be apparent to those skilled in the art that specific details need not be employed and that the examples provided herein, may include alternative embodiments and are not intended to limit the scope of the disclosure. In some examples, well-known processes, well-known device structures, and well-known technologies are not described in detail.

Referring to FIG. 1, a portion of a cutting machine 10 is illustrated along with a minimum quantity lubrication ("MQL") supply system 14 and a cutting tool 110. The cutting machine 10 can be any suitable cutting machine configured to provide MQL air-oil mist to the cutting tool 110. In the example provided, the cutting machine 10 includes a rotary feedthrough 18, a spindle 22, a tool holder 26 and a motor (not shown) that is configured to rotate the spindle about a central axis 30.

The MQL supply system 14 is schematically illustrated as a 1-channel MQL system such that the MQL supply system 14 provides a mixture of oil and compressed air as an air-oil mist to a single output conduit 34. Accordingly, the MQL supply system 14 can include an air compressor (not shown) or an inlet 38 configured to receive compressed air from compressed air source (not shown), and a regulator (not shown) configured to control a pressure or flow rate of the compressed air. The MQL supply system 14 can include an oil reservoir (not shown) or an inlet (not shown) configured to receive a supply of lubrication oil, and a device (e.g., a pump and/or regulator; not shown) configured to control a pressure or flow rate of the oil.

The output conduit 34 connects the MQL supply system 14 to the rotary feedthrough 18 for fluid communication. The rotary feedthrough 18 does not rotate with the spindle 22 but includes a pathway 42 coupled for fluid communication with a pathway 46 of the spindle so that the air-oil mist can travel from the rotary feedthrough 18 to the spindle 22 while the spindle 22 is rotating. The pathway 46 of the spindle 22 extends through the spindle 22 and can be coaxial with the central axis 30 of the spindle 22.

The tool holder 26 is mounted to the spindle 22 for common rotation with the spindle 22 and is configured to support a base portion 114 of the cutting tool 110 for common rotation about the central axis 30 with the tool holder 26 while a cutting portion 118 of the cutting tool 110 extends axially from the tool holder 26. The cutting tool 110 is removably mounted to the tool holder 26 such that the cutting tool 110 can be removed and replaced with another or different cutting tool (not shown). The tool holder 26 includes a pathway 50 coupled for fluid communication with the pathway 46 of the spindle 22 and coupled for fluid communication with the base portion 114 of the cutting tool 110 such that the air-oil mist is provided from the spindle 22 to the base portion 114 of the cutting tool 110 via the tool holder 26.

In an alternative configuration, not specifically shown, the MQL supply system 14 is a 2-channel MQL system such that the oil and air remain separate until being mixed within the cutting machine 10. For example, the air and oil may travel through separate conduits, which may optionally be concentric conduits, until mixing in a predetermined region of the cutting machine 10, such as within the tool holder 26 for example.

Figure 2:
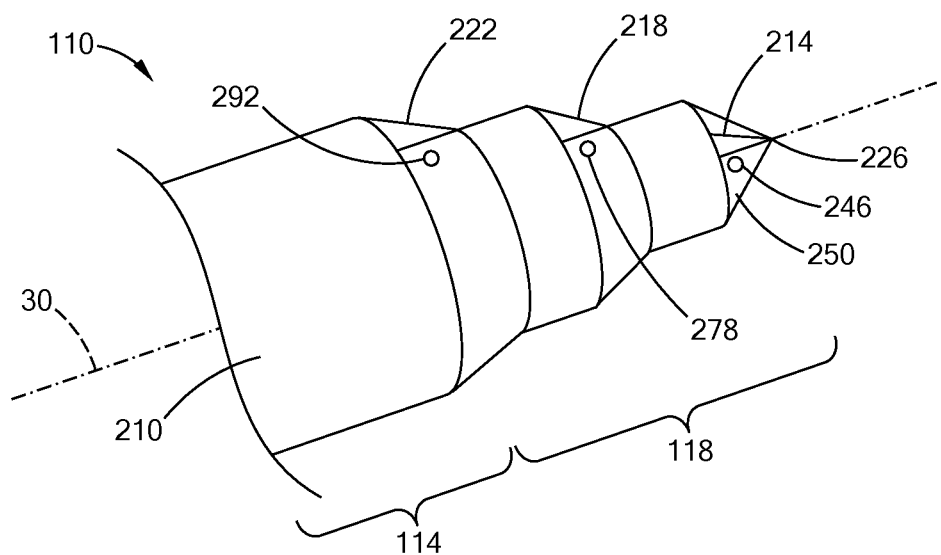
FIG. 2 is a perspective view of a cutting portion of the cutting tool of FIG. 1.
Figure 3:
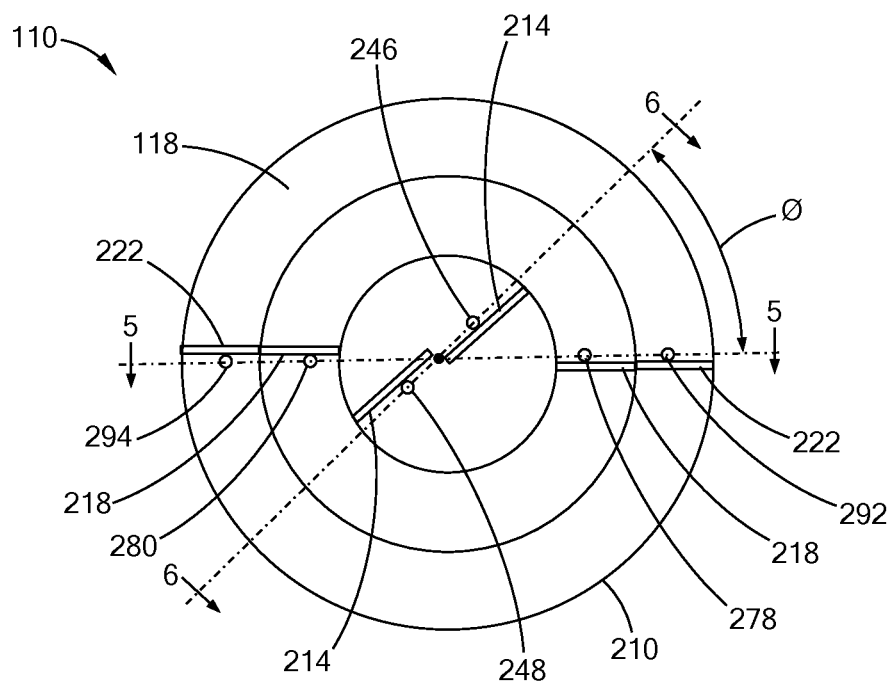
FIG. 3 is a top view of the cutting tool of FIG. 1.

Referring to FIGS. 2 and 3, the cutting tool 110 is a multi-diameter cutting tool including a unitary body 210 (i.e., one-piece body). The cutting tool 110 can be any suitable type of MQL multi-diameter cutting tool such as a reaming tool, a boring tool, or a drilling tool for example. In the example provided, the cutting tool 110 includes a plurality of first cutting edges 214, a plurality of second cutting edges 218, and a plurality of third cutting edges 222. The first cutting edges 214 are located proximate to an end 226 of the cutting portion 118 opposite the base portion 114 and are disposed at a first diameter. The second cutting edges 218 are located axially between the first cutting edges 214 and the third cutting edges 222 and are disposed at a second diameter that is greater than the first diameter. The third cutting edges 222 are located axially between the second cutting edges 218 and the base portion 114 and are disposed at a third diameter that is greater than the second diameter.

The first, second, and third cutting edges 214, 218, 222 can be sharpened faces of the body 210 that are within the cutting portion 118 or can be removable cutting blades that can be mounted to the body 210 at the associated diameters. In the example shown, the cutting edges 214, 218, 222 are generally flat, planar surfaces, though other configurations can be used. In an alternative configuration, the cutting edges 214, 218, 222 are helical edges.

As best shown in FIG. 3, the first cutting edges 214 of the example provided are rotationally offset from the second cutting edges 218 and the third cutting edges 222. In the example provided, the second cutting edges 218 and the third cutting edges 222 are rotationally aligned with each other, though other configurations can be used.

Figure 6:
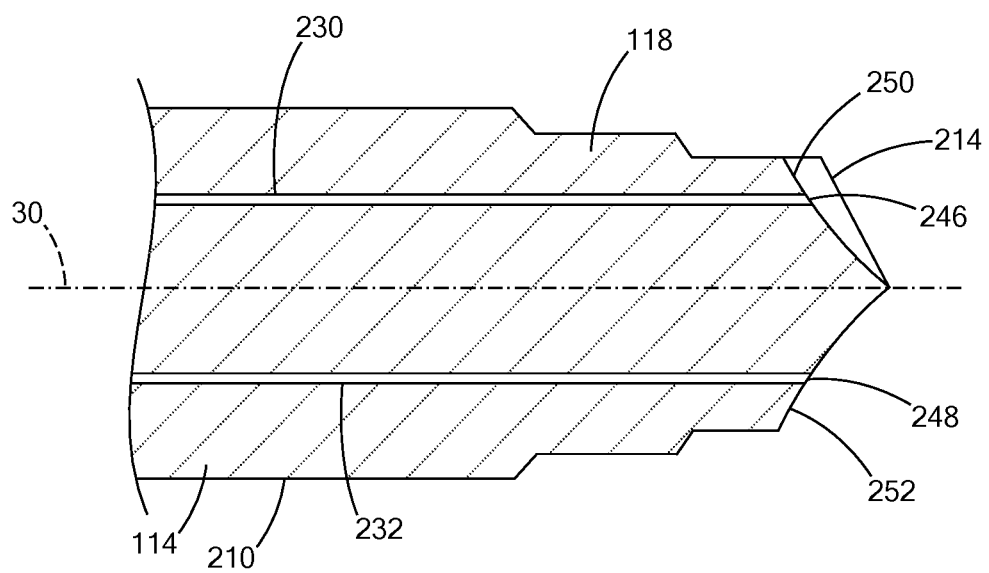
FIG. 6 is a cross-sectional view of the cutting tool of FIG. 1, taken along line 6-6 shown in FIG. 3.

Referring to FIGS. 3 and 6, the body 210 defines a plurality of independent passages 230, 232 that extend through the entire body 210 including the base portion 114 and the cutting portion 118. Each of the independent passages 230, 232 has an inlet 234, 238 (FIG. 4) open through an exterior surface 242 of the base portion 114 and an outlet 246, 248 open through an exterior surface 250, 252 of the body 210 proximate to a corresponding one of the first cutting edges 214. The independent passages 230, 232 are independent of each other and are independent of all other passages within the body 210. In the example provided, the independent passages 230, 232 extend axially through the body 210 in a linear manner, though other configurations can be used. In the example provided, the independent passages 230, 232 are parallel to each other, though other configurations can be used. In the example provided, the independent passages 230, 232 are parallel to and offset from the central axis 30.

Figure 4:
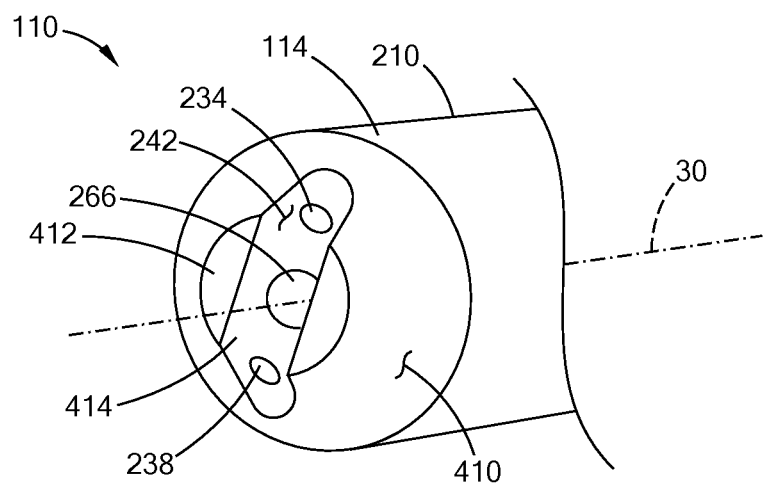
FIG. 4 is a perspective view of a base portion of the cutting tool of FIG. 1.
Figure 5:
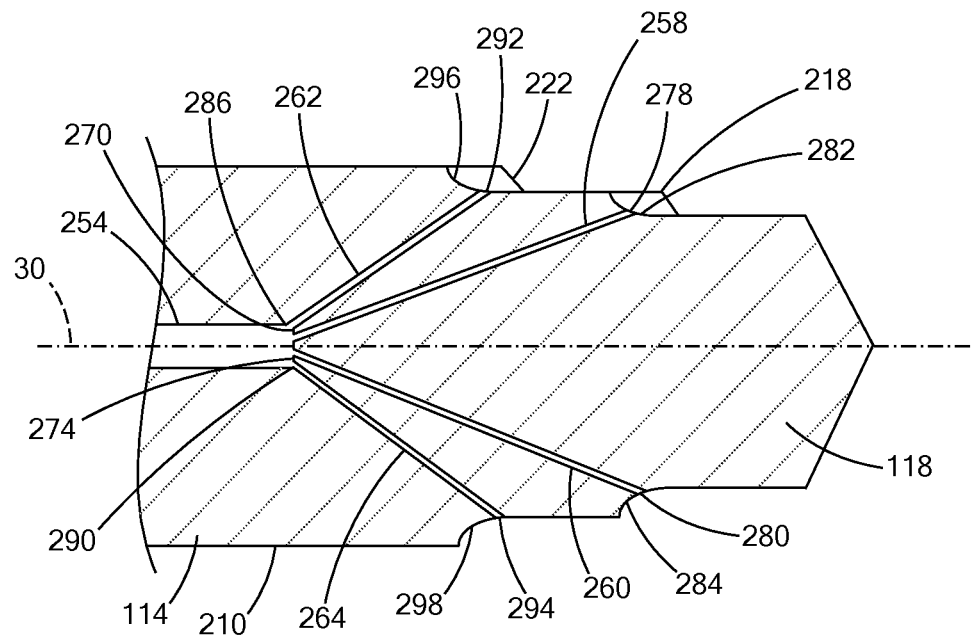
FIG. 5 is a cross-sectional view of the cutting tool of FIG. 1, taken along line 5-5 shown in FIG. 3.

Referring to FIGS. 3 and 5, the body 210 also defines a trunk passage 254, a plurality of first branch passages 258, 260 and a plurality of second branch passages 262, 264. The trunk passage 254 is coaxial with the central axis 30 and extends through at least part of the base portion 114. The trunk passage 254 has an inlet 266 (FIG. 4) open through the exterior surface 242 of the base portion 114. In the example provided, the trunk passage 254 terminates within the base portion 114, though other configurations can be used. Each of the first branch passages 258, 260 has an inlet 270, 274 open directly to the trunk passage 254 for fluid communication with the trunk passage 254 and an outlet 278, 280 open through an exterior surface 282, 284 of the body 210 proximate to a corresponding one of the second cutting edges 218. In the example provided, the first branch passages 258, 260 are linear, though other configurations can be used. Each of the second branch passages 262, 264 has an inlet 286, 290 open directly to the trunk passage 254 for fluid communication with the trunk passage 254 and an outlet 292, 294 open through an exterior surface 296, 298 of the body 210 proximate to a corresponding one of the third cutting edges 222. In the example provided, the second branch passages 262, 264 are linear, though other configurations can be used.

In the example provided, the first and second branch passages 258, 260, 262, 264 are disposed along a common plane (e.g., indicated by line 5-5 in FIG. 3) and the independent passages 230, 232 are disposed along a different plane (e.g., indicated by line 6-6 in FIG. 3) that is rotationally offset from the plane of the first and second branch passages 258, 260, 262, 264 by an angle θ.

In an alternative configuration not shown, the inlet 286, 290 of each second branch passage 262, 264 can be open directly to a corresponding one of the first branch passages 258, 260 instead of being open directly to the trunk passage 254. In another alternative configuration not shown, the trunk passage 254 extends into the cutting portion 118. In another alternative configuration not shown, the trunk passage extends through the base portion 114 and through the cutting portion 118 and is either open through the end 226 of the cutting portion 118 to allow fluid communication thereto, or a plug (not shown) is disposed in the trunk passage 254 at the end 226 that blocks flow from the trunk passage 254 out the end 226.

Referring to FIG. 4, the base portion 114 of the cutting tool 110 is configured to be received in the tool holder 26 (FIG. 1) and gripped by the tool holder 26 (FIG. 1). The base portion 114 forms a seal with the tool holder 26 (FIG. 1) such that the air-oil mist is directed from the tool holder 26 (FIG. 1) into the inlets 234, 238, 266. In the example provided, the base portion 114 includes a frustoconical sealing surface 410 that narrows toward an end 412 of the base portion 114, though other configurations can be used such as o-rings, seals, or other sealing surface geometries for example.

In the example provided, the base portion 114 defines a pre-chamber 414 or open channel that is open through the end 412. In the example provided, the pre-chamber 414 extends longitudinally in a direction that is transverse to the central axis 30 and through a portion of diametrically opposite sides of the sealing surface 410 to be open through the end 412 and opposite sides of the sealing surface 410, though other configurations can be used. In the example provided, the pre-chamber 414 does not extend in the axial direction toward the cutting portion 118 beyond the sealing surface 410. The inlets 234, 238, 266 are open directly to the pre-chamber 414 so that the air-oil mist flows from the tool holder 26 (FIG. 1) to the pre-chamber 414 and then to the inlets 234, 238, 266. In an alternative configuration not shown, the base portion 114 does not include the pre-chamber 414 and the inlets 234, 238, 266 are open directly through the sealing surface 410 or the end 412.

Accordingly, the inlets 234, 238, 266 of the independent passages 230, 232 and the trunk passage 254 are all located at the end 412. In the example provided, the independent passages 230, 232 are sized to deliver a greater amount of the MQL oil-air mist to their corresponding cutting edges 214 than is delivered to the cutting edges 218, 222 served by the branch passages 258, 260, 262, 264. In an alternative configuration, the independent passages 230, 232 are sized to deliver an equal amount of the MQL oil-air mist to their corresponding cutting edges 214 as is delivered to the cutting edges 218, 222 served by the branch passages 258, 260, 262, 264.

In an alternative configuration not shown, the cutting tool 110 may have only two cutting diameters with associated cutting edges. In this example, the cutting tool 110 does not have the third cutting edges 222 or the second branch passages 262, 264.

In other alternative configurations, the cutting tool 110 may have more than three cutting diameters with associated cutting edges. In one such example not shown, the cutting tool is similar to the cutting tool of FIGS. 1-6 except that it also includes a plurality of fourth cutting edges at a fourth diameter that is greater than the third diameter and axially between the third diameter and the base portion 114. In this example, each of the fourth cutting edges can be fed air-oil mist from a corresponding third branch passage that can be similar to the first and second branch passages in that the third branch passages can each have an inlet open directly to the trunk passage 254 and an outlet open proximate to the fourth cutting edges.

Another alternative example of a cutting tool 110' is illustrated in FIGS. 7-10. The cutting tool 110' is similar to the cutting tool 110 (FIGS. 1-6) except as otherwise shown or described herein. Similar features are illustrated with similar, but primed reference numerals and only differences are described in detail herein. In this example, the body 210' includes a plurality of first cutting edges 710, a plurality of second cutting edges 714, a plurality of third cutting edges 718, and also includes a plurality of fourth cutting edges 722. The first cutting edges 710 are located proximate to the end 226' of the cutting portion 118' opposite the base portion 114' and are disposed at a first diameter. The second cutting edges 714 are located axially between the first cutting edges 710 and the third cutting edges 718 and are disposed at a second diameter that is greater than the first diameter. The third cutting edges 718 are located axially between the second cutting edges 714 and the fourth cutting edges 722 and are disposed at a third diameter that is greater than the second diameter. The fourth cutting edges 722 are located axially between the third cutting edges 718 and the base portion 114' and are disposed at a fourth diameter that is greater than the third diameter.

The first, second, third, and fourth cutting edges 710, 714, 718, 722 can be sharpened faces of the body 210' that are within the cutting portion 118' or can be removable cutting blades that can be mounted to the body 210' at the associated diameters.

Figure 7:
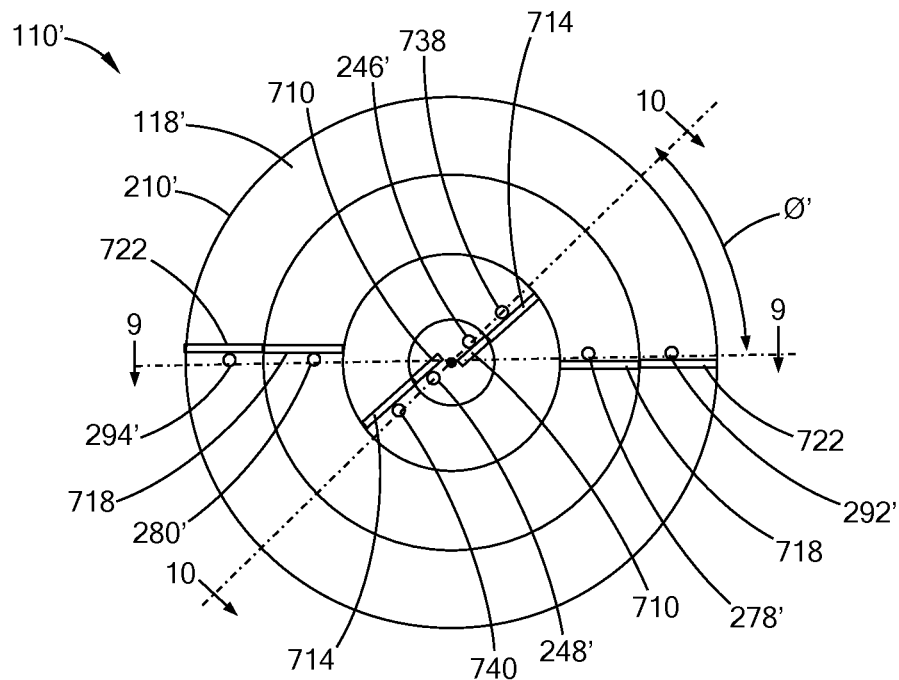
FIG. 7 is a top view of a cutting tool of a different configuration in accordance with the teachings of the present disclosure.

As best shown in FIG. 7, the first cutting edges 710 and the second cutting edges 714 are rotationally offset from the third cutting edges 718 and the fourth cutting edges 722. In the example provided, the first cutting edges 710 and the second cutting edges 714 are rotationally aligned with each other, though other configurations can be used. In the example provided, the third cutting edges 718 and the fourth cutting edges 722 are rotationally aligned with each other, though other configurations can be used.

Figure 8:
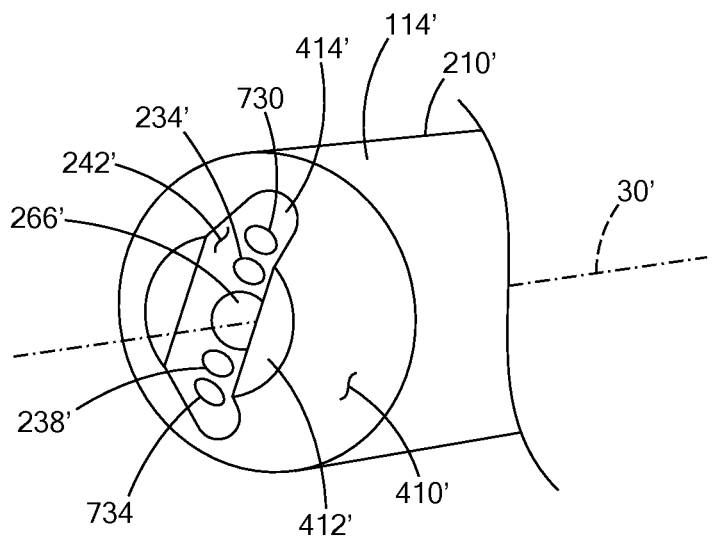
FIG. 8 is a perspective view of a base portion of the cutting tool of FIG. 7.
Figure 9:
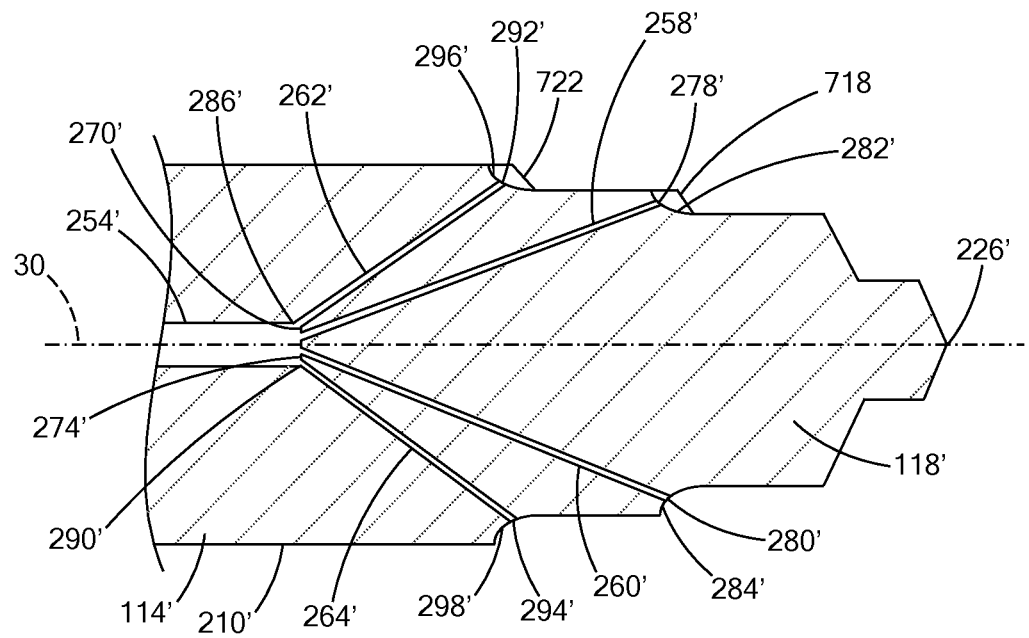
FIG. 9 is a cross-sectional view of the cutting tool of FIG. 7, taken along line 9-9 shown in FIG. 7.
Figure 10:
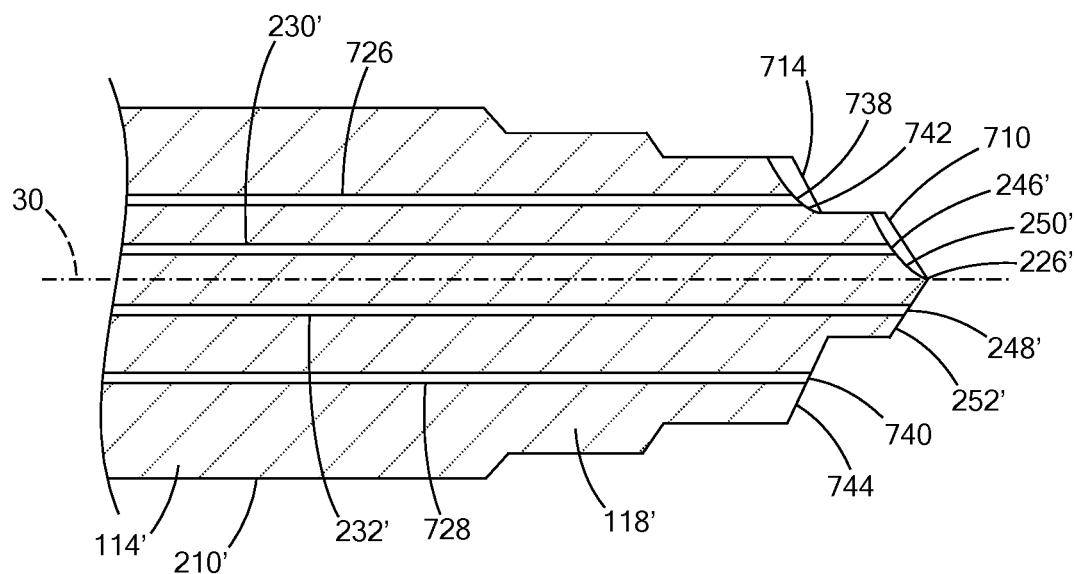
FIG. 10 is a cross-sectional view of the cutting tool of FIG. 7, taken along line 10-10 shown in FIG. 7.

Referring to FIGS. 7, 8, and 10, the body 210' defines a plurality of first independent passages 230', 232' and a plurality of second independent passages 726, 728 that extend through the entire body 210' including the base portion 114' and the cutting portion 118'.

Each of the first independent passages 230', 232' has an inlet 234, 238 (FIG. 8) open through the exterior surface 242' of the base portion 114' and an outlet 246', 248' open through the exterior surface 250', 252' of the body 210' proximate to a corresponding one of the first cutting edges 710. The first independent passages 230', 232' are independent of each other and are independent of all other passages within the body 210'. In the example provided, the first independent passages 230', 232' extend axially through the body 210' in a linear manner, though other configurations can be used. In the example provided, the first independent passages 230', 232' are parallel to each other, though other configurations can be used. In the example provided, the first independent passages 230', 232' are parallel to and offset from the central axis 30', though other configurations can be used.

Each of the second independent passages 726, 728 has an inlet 730, 734 (FIG. 8) open through the exterior surface 242' of the base portion 114' and an outlet 738, 740 open through the exterior surface 742, 744 of the body 210' proximate to a corresponding one of the second cutting edges 714. The second independent passages 726, 728 are independent of each other and are independent of all other passages within the body 210'. In the example provided, the second independent passages 726, 728 extend axially through the body 210' in a linear manner, though other configurations can be used. In the example provided, the second independent passages 726, 728 are parallel to each other, though other configurations can be used. In the example provided, the second independent passages 726, 728 are parallel to and offset from the central axis 30' and the first independent passages 230', 232', though other configurations can be used.

Referring to FIGS. 7, 8, and 10, the body 210' also defines a trunk passage 254', a plurality of first branch passages 258', 260' and a plurality of second branch passages 262', 264'. The trunk passage 254' is similar to the trunk passage 254 (FIG. 5). Each of the first branch passages 258', 260' has an inlet 270', 274' open directly to the trunk passage 254' for fluid communication with the trunk passage 254' and an outlet 278', 280' open through the exterior surface 282', 284' of the body 210' proximate to a corresponding one of the third cutting edges 718. In the example provided, the first branch passages 258', 260' are linear, though other configurations can be used. Each of the second branch passages 262', 264' has an inlet 286', 290' open directly to the trunk passage 254' for fluid communication with the trunk passage 254' and an outlet 292', 294' open through an exterior surface 296', 298' of the body 210' proximate to a corresponding one of the fourth cutting edges 722. In the example provided, the second branch passages 262', 264' are linear, though other configurations can be used.

In the example provided, the first and second branch passages 258', 260', 262', 264' are disposed along a common plane (e.g., indicated by line 9-9 in FIG. 7) and the first independent passages 230', 232' and the second independent passages 726, 728 are disposed along a different plane (e.g., indicated by line 10-10 in FIG. 7) that is rotationally offset from the plane of the first and second branch passages 258', 260', 262', 264' by an angle θ'.

In an alternative configuration not shown, the second independent passages 726, 728 are rotationally offset from the first independent passages 230', 232', with both the first and second independent passages 230', 232', 726, 728 being rotationally offset from the first and second branch passages 258', 260', 262', 264'.

As used herein, the phrase at least one of A, B, and C should be construed to mean a logical (A OR B OR C), using a non-exclusive logical OR, and should not be construed to mean "at least one of A, at least one of B, and at least one of C.

Unless otherwise expressly indicated, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

The terminology used herein is for the purpose of describing particular example forms only and is not intended to be limiting. The singular forms "a," "an," and "the" may be intended to include the plural forms as well, unless the context clearly indicates otherwise. The terms "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The description of the disclosure is merely exemplary in nature and, thus, examples that do not depart from the substance of the disclosure are intended to be within the scope of the disclosure. Such examples are not to be regarded as a departure from the spirit and scope of the disclosure. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A cutting tool comprising:
   a body disposed about a central axis and having a base and a cutting portion, the cutting portion defining a plurality of first edges and a plurality of second edges, the plurality of first edges being located at a first diameter and configured to remove material from a workpiece, the plurality of second edges being located at a second diameter that is greater than the first diameter and configured to remove material from the workpiece, the body defining a trunk passage, a plurality of first branch passages, and a plurality of first independent passages,
   wherein each of the first branch passages is open to the trunk passage and has an outlet open to an exterior of the cutting portion proximate to a corresponding one of the second edges such that the outlets of the first branch passages are configured to provide a mixture of lubrication oil and air to the second edges to lubricate the second edges, and
   wherein each of the first independent passages is independent of the trunk passage and the first branch passages and has an outlet open to an exterior of the cutting portion proximate to a corresponding one of the first edges such that the outlets of the first independent passages are configured to provide the mixture of lubrication oil and air to the first edges to lubricate the first edges, wherein each of the first independent passages has an inlet defined by the base and open to an exterior of the base.

2. The cutting tool according to claim 1, wherein the trunk passage is coaxially disposed about the central axis of the body and the first independent passages are not coaxial with the central axis.

3. The cutting tool according to claim 1, wherein the body defines a plurality of second branch passages and the cutting portion defines a plurality of third edges configured to remove material from the workpiece, the third edges being located at a third diameter that is greater than the second diameter, wherein each of the second branch passages is open to the trunk passage and has an outlet open through an exterior of the cutting portion proximate to a corresponding one of the third edges such that the outlets of the second branch passages are configured to provide the mixture of lubrication oil and air to the third edges to lubricate the third edges.

4. The cutting tool according to claim 1, wherein the body defines a plurality of second independent passages and the cutting portion defines a plurality of third edges configured to remove material from the workpiece, the third edges being located at a third diameter that is greater than the first diameter and less than the second diameter, wherein each of the second independent passages is independent of the trunk passage, the first branch passages, and the first independent passages and wherein each of the second independent passages has an outlet open to an exterior of the cutting portion proximate to a corresponding one of the third edges such that the outlets of the second independent passages are configured to provide the mixture of lubrication oil and air to the third edges to lubricate the third edges.

5. The cutting tool according to claim 1, wherein the first edges are rotationally offset from the second edges.

6. The cutting tool according to claim 1, wherein the branch passages extend linearly from the trunk passage to the second edges and the first independent passages extend linearly through the cutting portion to the first edges.

7. The cutting tool according to claim 1, wherein the base includes a sealing surface and a pre-chamber, the sealing surface being at an end of the base that is opposite the cutting portion and being configured to form a seal with a mating surface of a tool holder that is configured rotate the cutting tool about the central axis, the pre-chamber being recessed into the sealing surface, the trunk passage having an inlet open to the pre-chamber, each inlet of the first independent passages is open to the pre-chamber.

8. The cutting tool according to claim 1, wherein the first and second edges are helical.

9. The cutting tool according to claim 1, wherein the first and second edges are planar.

10. A minimum quantity lubrication (MQL) cutting machine comprising the cutting tool according to claim 1, wherein the MQL cutting machine is configured to provide the mixture of lubrication oil and air to the cutting tool.

11. A cutting tool comprising:
    a body having a base and a cutting portion, the body defining a trunk passage, a plurality of first branch passages, and a plurality of first independent passages, the cutting portion defining a plurality of first edges configured to remove material from a workpiece at a first diameter and a plurality of second edges configured to remove material from a workpiece at a second diameter that is greater than the first diameter,
    wherein the base defines an inlet of the trunk passage,
    wherein each of the first branch passages has an inlet open to the trunk passage and an outlet open to an exterior of the cutting portion proximate to a corresponding one of the second edges such that the outlets of the first branch passages are configured to provide a mixture of lubrication oil and air to the second edges to lubricate the second edges, and
    wherein each of the first independent passages has an inlet defined by the base and open to an exterior of the base and an outlet open to an exterior of the cutting portion proximate to a corresponding one of the first edges such that the outlets of the first independent passages are configured to provide the mixture of lubrication oil and air to the first edges to lubricate the first edges.

12. The cutting tool according to claim 11, wherein the first independent passages are independent of the first branch passages and the trunk passage throughout the body.

13. The cutting tool according to claim 11, wherein the body is disposed about a rotational axis and the trunk passage extends longitudinally coaxial with the rotational axis.

14. The cutting tool according to claim 13, wherein the first edges are rotationally offset from the second edges.

15. The cutting tool according to claim 13, wherein the first independent passages extend along corresponding first axes that are parallel and offset from the rotational axis.

16. The cutting tool according to claim 15, wherein the first branch passages extend linearly from the trunk passage to the second edges.

17. The cutting tool according to claim 11, wherein the body defines a plurality of second branch passages and the cutting portion defines a plurality of third edges, the third edges being configured to remove material from the workpiece at third diameter greater than second diameter, wherein each of the second branch passages has an inlet open to the trunk passage and an outlet open to an exterior of the cutting portion proximate to a corresponding one of the third edges such that the outlets of the second branch passages are configured to provide the mixture of lubrication oil and air to the third edges to lubricate the third edges.

18. The cutting tool according to claim 11, wherein the body defines a plurality of second independent passages and the cutting portion defines a plurality of third edges, the third edges being configured to remove material from the workpiece at third diameter different than first diameter and the second diameter, wherein each of the second independent passages is independent of the trunk passage, the first branch passages, and the first independent passages, wherein each second independent passage has an outlet open to an exterior of the cutting portion proximate to a corresponding one of the third edges such that the outlets of the second independent passages are configured to provide the mixture of lubrication oil and air to the third edges to lubricate the third edges.

19. A minimum quantity lubrication (MQL) cutting machine comprising the cutting tool according to claim 11, wherein the MQL cutting machine is configured to provide a mixture of oil and air to the cutting tool.

20. The cutting tool according to claim 11, wherein the base includes a sealing surface at an end of the base that is opposite the cutting portion, the sealing surface being configured to form a seal with a mating surface of a tool holder that is configured rotate the cutting tool about a central axis, wherein the base further defines a channel recessed into the sealing surface, the inlet of the trunk passage being open to the channel, each inlet of the first independent passages is open to the channel.

* * * * *